Patented Oct. 13, 1942

2,298,465

UNITED STATES PATENT OFFICE 2,298,465

NONFOAMING COOLING FLUID

Leo J. Clapsadle, Buffalo, N. Y., assignor to Carbide and Carbon Chemicals Corporation, a corporation of New York No Drawing. Application September 28, 1939, Serial No. 296,917

9 Claims. (Cl. 252—73)

The invention relates to cooling fluids of nonfoaming characteristics, and is particularly concerned with addition agents for anti-freeze cooling liquids adapted to retard or prevent foaming and the resultant loss of liquid from a circulatory cooling system.

In an automobile engine the cooling system usually operates under conditions conducive to the formation of foam in the cooling liquid. This is largely due to unavoidable aeration accompanied with a rapid circulation and agitation at high temperatures, whereby air bubbles are entrained in the cooling fluid and promote a foaming tendency. The presence of additive agents in the coolant, for purposes of preventing corrosion and leakage, may also further influence or promote foaming, and such materials are now of common usage in water cooling, as well as in anti-freeze cooling fluids. Foaming is undesirable in a cooling system, and if excessive may result in appreciable fluid loss through overflow or safety vents in the system. In an anti-freeze solution liquid loss in this manner can obviously become a serious and expensive problem, and it is particularly undesirable in a cooling fluid of the permanent anti-freeze type containing as the freezing point depressant a polyhydroxy alcohol, such as ethylene glycol, diethylene glycol, propylene glycol, or other glycols and their mixtures.

It is an object of this invention to provide cooling fluids inhibited against foam formation when circulated in a cooling system. A further object is to provide improved foam preventive agents for cooling fluids containing freezing point depressants, particularly those composed of glycols, which agents are adaptable in function with water dilutions of the anti-freeze and in the presence of other additive materials of a foam promoting nature.

I have found that aliphatic and aromatic esters of the higher saturated or unsaturated fatty acids are excellent foam prevention agents in cooling solutions. This includes particularly the lower alkyl derivatives, such as methyl, ethyl, and normal or branch-chain propyl, butyl and amyl esters, as well as the aryl esters, of which the phenyl derivatives are representative. The fatty acids preferred contain between 10 and 20 carbon atoms, and esters of stearic, palmitic and oleic acid are especially effective in their foam retarding action. Concentrations of these compounds of from about 0.05% to about 1.5% by weight of the cooling fluid are satisfactory, and in a glycol about 0.3% to 0.8% by weight of the compounds butyl stearate, iso-amyl stearate, ethyl oleate, butyl oleate, and phenyl stearate has been found sufficient to produce the desired foam retarding effect under normal cooling system operation.

The ability of these esters to reduce or prevent liquid losses by foaming appears to reside primarily in the fact that they are surface active compounds substantially insoluble in water or aqueous anti-freeze solutions. They therefore tend to spread on the surface of the cooling fluid, and to form interfacial films at gas-liquid boundaries, which films are sufficiently mobile to prevent stabilization of air dispersions and accelerate large air bubble formation. In this way overflow losses from recirculation of entrained air are reduced or eliminated entirely. Other desirable and essential properties, which are of importance to any anti-freeze foam preventive agent, include a compatibility with other additive materials present in an anti-freeze solution, thus avoiding interference with the required function of corrosion inhibitors, leak preventive agents and the like, and the lack of any tendency to attack or corrode metal and rubber parts of the cooling system.

The invention contemplates the use of the esters specified in association with water, or alcohol and glycol anti-freeze solutions, and in the presence of many types and kinds of other additive agents, including those which in themselves exhibit a foam promoting tendency. Obviously many different anti-freeze formulae are possible within the scope of this disclosure, in which the compounds here disclosed constitute the essential foam preventive agent. The appended claims include many such modifications and define the intended limits of the invention.

I claim:

1. An aqueous cooling fluid containing an alcoholic freezing point depressant, and a foam preventive agent composed essentially of a compound of the group consisting of aliphatic and aromatic esters of a fatty acid containing from 10 to 20 carbon atoms, in amount of about 0.05% to 1.5% by weight of the alcoholic component.

2. An aqueous cooling fluid containing a glycol as a freezing point depressant, and a foam preventive agent composed essentially of a lower alkyl ester of an acid of the group consisting of stearic, palmitic and oleic acids, in an amount of about 0.05% to 1.5% by weight of the glycol component.

3. An aqueous cooling fluid containing a glycol as a freezing point depressant, and a foam preventive agent composed essentially of an aromatic ester of an acid of the group consisting of stearic, palmitic and oleic acids, in an amount of about 0.05% to 1.5% by weight of the glycol component.

4. An aqueous cooling fluid containing ethylene glycol as a freezing point depressant and a foam preventive agent composed essentially of butyl stearate, in an amount of about 0.3% to 0.8% by weight of the glycol component.

5. An aqueous cooling fluid containing ethylene glycol as a freezing point depressant and a foam preventive agent composed essentially of ethyl oleate, in an amount of about 0.3% to 0.8% by weight of the glycol component.

6. An aqueous cooling fluid containing ethylene glycol as a freezing point depressant and a foam preventive agent composed essentially of phenyl stearate, in an amount of about 0.3% to 0.8% by weight of the glycol component.

7. Method of preventing foaming of an aqueous cooling fluid in a circulatory cooling system, which comprises circulating said fluid with an admixture thereto of a foam preventive agent composed essentially of a compound of the group consisting of aliphatic and aromatic esters of a fatty acid containing from 10 to 20 carbon atoms, in an amount not substantially greater than about 1.5% by weight.

8. Method of preventing foaming of an aqueous glycol-containing anti-freeze cooling fluid in a circulatory cooling system, which comprises circulating said fluid with an admixture thereto of a foam preventive agent composed essentially of a lower alkyl ester of an acid of the group consisting of stearic, palmitic and oleic acids, in an amount of about 0.05% to 1.5% by weight of the glycol component.

9. Method of preventing foaming of an aqueous glycol-containing anti-freeze cooling fluid in a circulatory cooling system, which comprises circulating said fluid with an admixture thereto of a foam preventive agent composed essentially of an aromatic ester of an acid of the group consisting of stearic, palmitic and oleic acids, in an amount of about 0.05% to 1.5% by weight of the glycol component.

LEO J. CLAPSADLE.